United States Patent [19]

Harbach

[11] Patent Number: 4,539,276

[45] Date of Patent: Sep. 3, 1985

[54] SOLID ELECTROLYTE

[75] Inventor: Friedrich Harbach, Heidelberg, Fed. Rep. of Germany

[73] Assignee: Brown, Boveri & Cie AG, Mannheim-Käfertal, Fed. Rep. of Germany

[21] Appl. No.: 563,873

[22] Filed: Dec. 21, 1983

[30] Foreign Application Priority Data

Dec. 24, 1982 [DE] Fed. Rep. of Germany ....... 3247967

[51] Int. Cl.³ .............................................. H01M 6/18
[52] U.S. Cl. ...................................... 429/191; 429/33; 429/193
[58] Field of Search ................... 429/193, 191, 104, 33; 252/62.2

[56] References Cited

U.S. PATENT DOCUMENTS

| | | | |
|---|---|---|---|
| 4,113,928 | 9/1978 | Virkar et al. | 429/193 |
| 4,117,056 | 9/1978 | Jones | 429/193 X |
| 4,138,455 | 2/1979 | Shaikh et al. | 429/193 X |
| 4,197,365 | 4/1980 | Farrington et al. | 429/193 |
| 4,210,707 | 7/1980 | Farrington | 429/193 X |
| 4,280,475 | 6/1981 | Paruso et al. | 429/193 |
| 4,307,138 | 12/1981 | Powers et al. | 429/193 X |
| 4,425,415 | 1/1984 | Singh | 429/193 |

Primary Examiner—Anthony Skapars
Attorney, Agent, or Firm—Herbert L. Lerner; Laurence A. Greenberg

[57] ABSTRACT

Solid electrolyte consisting of a ceramic of the aluminum oxide-and-sodium oxide type. The ceramic forming the solid electrolyte has a composition according to the formula $$A_{1+z_1+2z_2}M^I_{z_2}M^{II}_{z_1}Al_{11-z_2-z_1}O_{17}$$

and consists X-ray-wise 100% of a fully stabilized $\beta''$—$Al_2O_3$ phase; wherein A stands for an alkali metal, silver, hydrogen or a hydrogen-containing compound; and $M^I$ and $M^{II}$ are elements which furnish mono- or bivalent ions; and $z_1$ and $z_2$ have values between 0 and 1, and the sum of $z_1+2z_2$ is between 0.4 and 0.9.

10 Claims, 1 Drawing Figure

U.S. Patent  Sep. 3, 1985  4,539,276
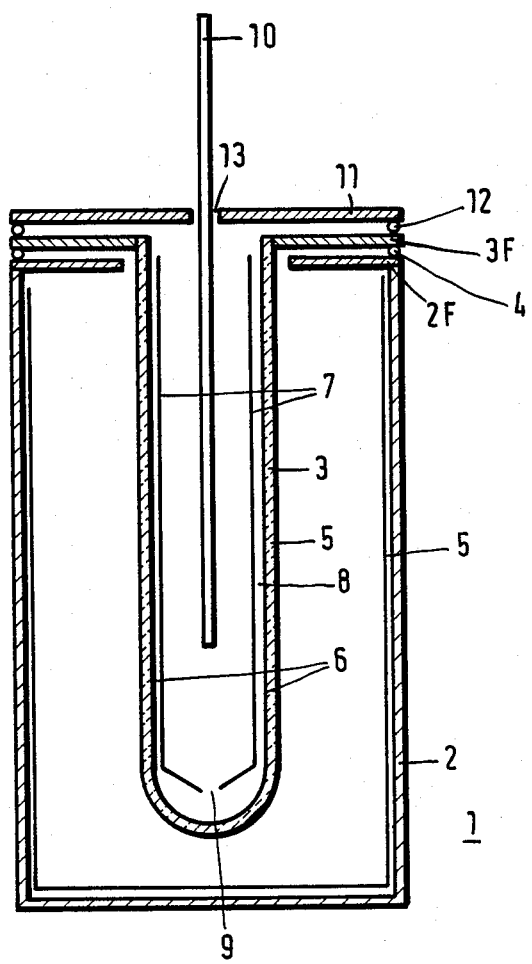

SOLID ELECTROLYTE

BACKGROUND OF THE INVENTION

1. Field of the Invention

The invention relates to a solid electrolyte of the aluminum oxide-and-sodium oxide type.

2. Description of the Prior Art

Such solid electrolytes are used, for instance in Na/S storage cells which are used for the construction of high-temperature storage batteries.

In rechargeable electrochemical storage cells of the sodium and sulfur type, the reactant spaces are separated from each other by a solid electrolyte which conducts sodium ions. The solid electrolytes used in the storage cells, which are, for instance, made of beta-aluminum oxide, are distinguished by the fact that the partial conductivity of the mobile ion is very high and the partial conductivity of the electrons is smaller by several powers of ten. By the use of such solid electrolytes for the construction of electrochemical storage cells there is practically no self-discharge, since the electron conductivity is negligible, nor can the reaction substances get through the solid electrolyte as neutral particles. An advantage of these storage cells is that no electrochemical secondary reactions occur during charging. The reason therefor again is that only one ion type can get through the solid electrolyte. The current yield of such a storage cell is therefore approximately 100%. Storage cells of the sodium and sulfur type are therefore being considered preferably for the design of high-temperature storage batteries.

The use of beta-aluminum oxides in the form of ceramic components in sodium/sulfur storage cells and in other electrochemical cells which are based on the practically exclusive passage of sodium ions or other alkali or earth alkali ions, of silver ions, of protons or proton-transporting compounds under the influence of a gradient of the electrochemical potential, is known from German Pat. No. 15 96 077. Typical sodium-ion-conducting beta-aluminum oxide consists primarily of 80 to 95% of aluminum oxide and 5 to 12% of sodium oxide; in oxide-ceramic technology it is customary to refer the components of the composition mass-wise to the oxides of the metals present.

From this composition it will be evident that beta-aluminum oxide cannot be a structural modification of the chemical compound aluminum oxide ($Al_2O_3$), as is true, for instance with $\alpha$—$Al_2O_3$ or $\gamma$—$Al_2O_3$. The misleading name beta-aluminum oxide has historical reasons; sodium oxide ($Na_2O$) or chemically related compounds such as other alkali metal oxides, earth alkali metal oxides, silver oxide, water or other compounds containing water are essential components of this chemical compound.

There are at least four different beta-aluminum oxide structures, namely $\beta$-, $\beta''$-, $\beta'''$- and $\beta''''$—$Al_2O_3$ which have as a common feature the buildup of several successive densely-packed oxygen layers, which are separated block-wise by two-dimensional parallel layers with reduced oxygen content. These intermediate layers contain in addition to the oxygen ions, the mobile ions which are essential for the use of beta-aluminum oxides as solid electrolytes. Of the phases mentioned above, the $\beta$- and the $\beta''$—$Al_2O_3$ phases are preferred. $\beta$—$Al_2O_3$ has the theoretical composition $A_2O \cdot 11Al_2O_3$. The symmetry of the structure belongs to the space group $P6_3/mmc$. The cell unit has a repetitive crystallographic spacing along the c-axis of about 2.2 nm. Customarily associated with $\beta''$—$Al_2O_3$ is the theoretical composition $A_2O \cdot 5.33Al_2O_3$. $\beta''$—$Al_2O_3$ crystallizes in the space group R3m. The crystallographic spacing along the c-axis of the triple-primitive hexagonal elementary cell is approximately 3.4 nm. In the composition formulas, A stands for an alkali metal or silver or hydrogen and determines the ions that are mobile within the solid electrolyte. The formulas above can readily be changed for possible consideration of earth alkali metals or hydrogen-containing compounds as substitutes. Examples of hydrogen containing compounds may be a lower hydrocarbon, i.e. a hydrocarbon having 1 to 5 carbonations. The other symbols have the customary chemical meaning.

Of the two last-mentioned phases, the $\beta$—$Al_2O_3$ phase has the higher alkali ion conductivity. The $\beta''$—$Al_2O_3$ phase which is customarily desired for this reason, and the customarily less desirable $\beta$—$Al_2O_3$ phase can be distinguished by conventional X-ray diffraction techniques (for instance with a Bragg-Brentano diffractometer) due to their symmetry. In the meantime it therefore has become state of the art to make beta-aluminum oxide ceramics, the by far largest part of which consists of the $\beta''$—$Al_2O_3$ phase, which can again be determined by X-rays.

The addition of doping substances is known from German Pat. No. 15 96 078. These doping substances serve, not only for lowering the resistance of a ceramic component of beta-aluminum oxide to migration of the mobile cations under the influence of a gradient of the electrochemical potential, but also for the thermal stabilization of the $\beta''$—$Al_2O_3$ structure during the firing of the ceramic.

The additions of lithium, magnesium or similar metals with a valence not exceeding 2 are always less than three mass % in solid electrolyte ceramics which are made in accordance with the known methods. The known magnesium-doped sodium ion-conducting beta-aluminum oxide ceramics always contain between 7 and 9% $Na_2O$ and between 1.5 and 2.5% MgO, while the remainder consists of $\beta''Al_2O_3$.

Recent investigations, using an X-ray diffraction technique with higher resolution (Guinier-camera), have shown that the known manufacturing methods, using the mentioned compositions, do not lead to a single-phase $\beta''$—$Al_2O_3$ solid electrolyte ceramic. The so-manufactured ceramics (under some circumstances besides an also present $\beta$—$Al_2O_3$ phase inventory) have two partial $\beta''$—$Al_2O_3$ phases. Both partial phases have different properties with respect to their usability in solid electrolyte ceramics. One of these partial phases does not contain the additions of metal ions with a valence not exceeding 2 to a sufficient degree to guarantee a structure-related charge equalization of the mobile cations present without the assistance of lattice defects such as aluminum voids and/or interstitial oxygen ions. This is, so to speak, a partially stabilized phase. The second partial phase contains just as many additives of metal ions with a valence not exceeding 2, so that no further lattice defects other than the incorporation of these additives instead of aluminum ions are necessary for the structure-related charge equalization of the mobile cations present. This is therefore a fully stabilized phase.

SUMMARY OF THE INVENTION

Starting out from the state of the art mentioned at the outset, it is an object of the invention to provide a solid electrolyte of a fully stabilized $\beta''$—$Al_2O_3$ which is single-phased radiographically.

With the foregoing and other objects in view, there is provided in accordance with the invention a solid electrolyte ceramic having a composition according to the general formula 1a:

$$A_{1+z_1+2z_2}M^I_{z_2}M^{II}_{z_1}Al_{11-z_2-z_1}O_{17}$$

wherein A stands for an alkali metal, silver, hydrogen or a hydrogen-containing compound; $M^I$ and $M^{II}$ are elements which furnish mono or bivalent ions; $Z_1$ and $Z_2$ each have a value of 0 to 1 with the proviso that the sum of $Z_1+2Z_2$ is between 0.4 and 0.9 and wherein the composition consists 100%, determined by X-ray diffraction, of a fully stabilized $\beta''$—$Al_2O_3$ phase.

Other features which are considered as characteristic for the invention are set forth in the appended claims.

Although the invention is illustrated and described herein as embodied in a solid electrolyte, it is nevertheless not intended to be limited to the details shown, since various modifications may be made therein without departing from the spirit of the invention and within the scope and range of the equivalents of the claims.

BRIEF DESCRIPTION OF THE DRAWING

The invention, however together with additional objects and advantages thereof will be best understood from the following description when read in connection with the accompanying drawing which diagrammaticaly illustrates an electrochemical storage cell of the sodium and sulfur type embodying a solid electrolyte ceramic having a composition of a fully stabilized $\beta''$—$Al_2O_2$ phase in accordance with the invention.

DETAILED DESCRIPTION OF THE INVENTION

The invention relates to a solid electrolyte with a ceramic of the aluminum oxide-and-sodium oxide type.

According to the invention, the ceramic forming the solid electrolyte has a composition according to the formula:

$$A_{1+z_1+2z_2}M^I_{z_2}M^{II}_{z_1}Al_{11-z_2-z_1}O_{17}$$

and consists X-ray-wise 100% of a fully stabilized $\beta''$—$Al_2O_3$ phase. A stands here for an alkali metal, silver, hydrogen or a hydrogen-containing compound. $M^I$ and $M^{II}$ are elements which furnish mono- or bivalent ions. The indices $z_1$ and $z_2$ represent parameters which characterize the material contents of the participating elements or compounds, particularly of A, $M^I$, $M^{II}$, aluminum and oxygen. $z_1$ and $z_2$ may assume values between 0 and 1.

The solid electrolyte according to the invention has in the temperature range of 200° to 400° C. a higher electric conductivity for the mobile ions and a smaller temperature dependence of the electric conductivity than the solid electrolyte ceramics which are part of the state of the art.

A solid electrolyte with the compositions according to the invention further exhibits improved thermal stability, and in particular, no redevelopment of the $\beta''$—$Al_2O_3$ phase into the less desirable $\beta$—$Al_2O_3$ phase takes place at temperatures which are required for the manufacture of a dense ceramic body of this material. The fully stabilized single-phase $\beta''$—$Al_2O_3$ ceramic of the solid electrolyte further exhibits greater resistance against atmospheric influences relative to the ceramics that have become known so far. In particular, it reacts substantially less and also more slowly with moisture. This means less mechanical stress on the structure of this phase. A solid electrolyte ceramic which has only a fully stabilized $\beta''$—$Al_2O_3$ phase permits handling with fewer problems and further ensures a reduction of the danger of moisture-related operating problems if it is used in electrochemical cells.

The use of the general formula, by means of which the solid electrolyte ceramic is made, provides not only for determined additions of metals with a valence not exceeding 2 in sufficient amount, but also determines that a suitable ratio of the mobile cations of the element or the compound to the single- or bi-valent ions of the metals $M^I$ or $M^{II}$ is observed.

This ratio is defined unambiguously by stating the values of $z_1$ and $z_2$. Adjusting the correct ratio in the finished solid electrolyte ceramic is more important here than adjusting the correct ratios at the beginning or in the course of the manufacturing process. To what extent the end product has a correct ratio can be determined by structure diffraction techniques with sufficient resolution. One such technique is X-ray diffraction. It is performed on a sample piece of the ceramic according to the invention, which can be used here also as finely milled powder. A Guinier camera is preferably used for the determination, using monochromatic X-rays, and with the recording of the diffracted radiation best made on a film coated on one side. The experimental resolution must be such that two reflexes, for instance for Cu-$K_{\alpha1}$-radiation the wavelength 1.56051 Å are generated from a sample under twice the refraction angle $2\theta$ between 30° and 40° each with a half-of maximum intensity bandwidth (half width) of less than 0.03° and a spacing of more than 0.07°, and are separately detectable in the record. It must furthermore be assured that storage of the finished ceramics and the finely milled powder which may have been made of it subsequently, up to the structure examination does not absorb moisture. Such absorption of moisture would affect undesirable, partially stabilized $\beta''$—$Al_2O_3$ phases. X-ray lines which are associated only with these phases would be shifted by structure changes of these phases which are caused by the absorption of moisture, and could coincide with initially separated X-ray lines of the phase fully stabilized according to the invention, so that in the worst case, the presence of a partial phase, which is undesirable according to the invention, could not be detected. A slight amount of moisture absorption can be eliminated in a sodium ion-conducting solid electrolyte by heating at 800° C. for two hours and subsequently cooling in an inert atmosphere.

The ceramic according to the invention shows under these conditions only one reflex in the X-ray diffraction with the radiation indicated above between $2\theta=34.5°$ and 34.9°; this reflex furthermore has a 50%-width of at most 0.1°.

The general formula for magnesium-stabilized sodium ion-conducting solid electrolyte ceramics, according to which its preparation and in particular its composition is prepared, reads as follows:

$$Na_{1+z} Mg_z Al_{11-z} O_{17}$$

or in an oxidic presentation preferred in ceramic practice:

$$(1+z_1)Na_2O; (2z_1)MgO; (11-z_1)Al_2O_3.$$

The value of $z_1$ is between 0.4 and 0.9, preferably between 0.6 and 0.8.

In a preferred embodiment, $z_1$ has a value between 0.68 and 0.78. The best single-phase fully stabilized $\beta''Al_2O_3$ ceramic can be produced in this narrow range.

The composition of the solid electrolyte ceramic can then be represented by the general formula:

$$Na_{1.73}Mg_{0.73}Al_{10.27}O_{17}$$

The use of the solid electrolyte according to the invention in an electrochemical storage cell will be explained in the following, making reference to the drawing;

In the drawing, an electrochemical storage cell 1 of the sodium and sulfur type is bounded by a metallic housing 2 which in the embodiment example shown here is cup-shaped. The housing 2 is preferably made of aluminum or a heat-resistant steel and has at its upper open end an inward-pointing flange 2F. A cup-shaped solid electrolyte 3 which has an outward-pointing flange 3F at its upper end is arranged in the interior of the cup-shaped housing 2. The flange 3F is formed by an insulating ring of alpha-aluminum oxide ceramic and is joined to the solid electrolyte 3 by means of glass solder (not shown here). The flange 3F is placed with the interposition of a gasket 4 on the inward-pointing flange 2F of the housing 2 and is supported there. The dimensions of the solid electrolyte 3 are chosen to provide a coherent space 5 all around between the outer surface of electrolyte 3 and the inner surface of the housing 2. Coherent space 5 serves, in the embodiment example shown here, as the cathode space. The latter is filled with a graphite felt which is saturated with sulfur. The interior of the solid electrolyte 3 serves as the anode space 6.

Within the solid electrolyte 3, a safety container 7 is arranged for receiving the sodium. The dimensions of the safety insert 7 are made to leave a narrow gap 8 between it and the solid electrolyte 3. The safety insert 7 has an opening 9 at its downward-pointing end, through which the sodium can emerge into the safety gap 8. An anodic current collector 10 which is formed by a rod of metal protrudes into the anode space 6 and in particular into the safety insert 7. The anode space is closed off to the outside by a plate 11. The latter is supported on the flange 3F of the solid electrodyte 3 via a gasket 12. The second end of the anodic collector 10 is brought to the outside through an opening 13 in the plate 11 and protrudes beyond the storage cell 1 by a few millimeters (for clarity the distances are exaggerated in the drawing).

The solid electrolyte 3 which is provided for conducting cations, particularly sodium ions, from the anode space 6 into the cathode space 5 consists, according to the invention, of a single-phase fully stabilized $\beta''$—$Al_2O_3$ ceramic. The ceramic forming the solid electrolyte 3 is formed in accordance with the following formula (1)

$$A_{1+z_1+2z_2} M^I_{z_2} M^{II}_{z_1} Al_{11-z_2-z_1} O_{17} \tag{1}$$

The indices $z_1$ and $z_2$ represent parameters which characterize the mass contents of the participating elements or compounds A, $M^I$, $M^{II}$, aluminum (Al) and oxygen (O). $z_1$ and $z_2$ may assume values between 0 and 1. However, the sum of $z_1$ and $2z_2$ is larger than 0.4, but smaller than 0.9. A represents and alkali metal, silver, hydrogen or a hydrogen-containing compound. $M^I$ and $M^{II}$ are elements which furnish mono- or bivalent ions.

The solid electrolyte used in the embodiment example presented here is formed by a ceramic which is composed in accordance with the following formula (2):

$$(1+z_1)Na_2O; (2a_1)MgO: (11-z_1)Al_2O_3. \tag{2}$$

wherein $z_1$ is greater than 0.4 and less than 0.9.

This formula is obtained by giving $z_2$ a 0 value in the above-given general formula (1). Furthermore, A is replaced by sodium and $M^{II}$ by magnesium, and the formulation, related to the elements, by an oxidic representation which is preferred in practice. Preferably, $z_1$ has here a value between 0.68 and 0.78.

In fabricating the cup-shaped, sodium ion-conducting solid electrolyte of $\beta''$—$Al_2O_3$ ceramic in the embodiment shown here, one starts out with a mixture of aluminum oxide, sodium oxide and the oxides of one or more metals with valences not exceeding 2 and/or materials which are converted, with heat supplied, into the above-mentioned required oxides and/or into materials which represent the compounds of these oxides (in situ production). Subsequently, a blank is pressed from this mixture with the aid of a mold; to obtain the desired strength, the blank is subsequently fired.

Such a ceramic can be made, for instance, from a powder which contains 8.07% $Na_2O$ and 3.34% MgO with the remainder $Al_2O_3$. After the cup-shaped solid electrolyte is fired, its ceramic has a composition which comprises 7.72% $Na_2O$ and 3.35% MgO, the remainder consisting of $Al_2O_3$. This composition corresponds to the invention. It is obtained from the specified formula (2) if a value of 0.5 is set. This single-phase fully stabilized $\beta''$—$Al_2O_3$ ceramic according to the invention has only one reflex at 34.56° in that X-ray diffraction investigation in the range of 34.5° to 34.9°. It has a density of 3.21 g/cm$^3$. At 300° C. it has a resistivity of 5.3 ohm cm. The activation energy in the temperature range 200° to 400° is 24 kg/mol.

A single-phase, fully stabilized X-ray-wise $\beta''$—$Al_2O_3$ ceramic can be prepared from a powder mixture which is a composition of 8.92% $Na_2O$ and 4.42% MgO with the remainder consisting of $Al_2O_3$. After the firing, the ceramic of the solid electrolyte has a composition of 8.53% $Na_2O$ and 4.44% MgO, the remainder being $Al_2O_3$. The composition of the ceramic is determined by the specified formula (2) by setting a value of 0.67 for $z_1$. The ceramic according to the invention has a density of 3.21 g/cm$^3$ and has a resistivity at 300° C. of 4.3 ohm cm. Its activation energy is 19 kJ/mol.

According to the objective of the invention, the ceramic has only one reflex at 34.55° in the X-ray diffraction investigation in the range between 34.5° and 34.9°.

Powder with the composition 9.59% $Na_2O$ and 5.28% MgO, the remainder consisting of $Al_2O_3$, can be fired to produce a ceramic with the composition 9.17% $Na_2O$ and 5.30% MgO, remainder being $Al_2O_3$. This composition is determined by the specified formula 2, by setting a value of 0.80 for $z_1$. The ceramic according to the invention has only one reflex at 34.80° in the X-ray diffraction investigation in the range of 34.5° to 34.9°. It has a density of 3.19 g/cm³ and has a resistivity of 4.3 ohm cm at 300° C. Its activation energy is 18 kJ/mol.

The foregoing is a description corresponding, in substance, to German application No. P 32 47 967.0, dated Dec. 24, 1982, international priority of which is being claimed for the instant application, and which is hereby made part of this application. Any material discrepancies between the foregoing specification and the specification of the aforementioned corresponding German application are to be resolved in favor of the latter.

There are claimed:

1. A solid electrolyte ceramic having a composition according to the general formula:

$$A_{1+z_1+2z_2}M^I_{z_2}M^{II}_{z_1}Al_{11-z_2-z_1}O_{17}$$

wherein A stands for an alkali metal, silver, hydrogen or a hydrogen-containing compound; $M^I$ and $M^{II}$ are elements which furnish mono or bivalent ions; $z_1$ and $z_2$ each have a value of 0 to 1 with the proviso that the sum of $z_1+2z_2$ is between 0.4 and 0.9 and wherein the composition consists of a fully stabilized $\beta''$—$Al_2O_3$ as determined by X-ray diffraction.

2. Solid electrolyte ceramic according to claim 1, wherein $M^I$ stands for lithium, and $M^{II}$ for magnesium.

3. Solid electrolyte ceramic according to claim 1, wherein $z_2$ has the value 0 and $z_1$ has a value between 0.6 and 0.8.

4. Solid electrolyte ceramic according to claim 2, wherein $z_2$ has the value 0 and $z_1$ has a value between 0.6 and 0.8.

5. Solid electrolyte ceramic according to claim 1, wherein $z_2$ has a value 0 and $z_1$ has a value between 0.68 and 0.78.

6. Solid electrolyte ceramic according to claim 2, wherein $z_2$ has a value 0 and $z_1$ has a value between 0.68 and 0.78.

7. Solid electrolyte ceramic according to claim 1, wherein the composition has the formula:

$$(1+z_1)Na_2O; (2z_1)MgO; (11z_1)Al_2O_3$$

wherein $z_1$ has a value between 0.6 and 0.8 and $z_2$ is 0.

8. Solid electrolyte ceramic according to claim 2, wherein the composition has the formula:

$$(1+z_1)Na_2O; (2z_1)MgO; (11z_1)Al_2O_3$$

wherein $z_1$ has a value between 0.6 and 0.8 and $z_2$ is 0.

9. Solid electrolyte ceramic according to claim 7, wherein the composition has the formula:

$$Na_{1.73}Mg_{0.73}Al_{10.27}O_{17}.$$

10. Solid electrolyte ceramic according to claim 8, wherein the composition has the formula:

$$Na_{1.73}Mg_{0.73}Al_{10.27}O_{17}.$$

* * * * *